US012450322B1

(12) United States Patent
Aggarwal et al.

(10) Patent No.: US 12,450,322 B1
(45) Date of Patent: Oct. 21, 2025

(54) SYSTEM TO DETERMINE BIOMETRIC IDENTIFICATION TRAINING DATA

(71) Applicant: AMAZON TECHNOLOGIES, INC., Seattle, WA (US)

(72) Inventors: Manoj Aggarwal, Seattle, WA (US); Gerard Guy Medioni, Los Angeles, CA (US); Igor Kviatkovsky, Haifa (IL); Alon Shoshan, Haifa (IL)

(73) Assignee: AMAZON TECHNOLOGIES, INC., Seattle, WA (US)

(*) Notice: Subject to any disclaimer, the term of this patent is extended or adjusted under 35 U.S.C. 154(b) by 178 days.

(21) Appl. No.: 18/322,785

(22) Filed: May 24, 2023

(51) Int. Cl.
G06F 21/32 (2013.01)
G06V 20/70 (2022.01)

(52) U.S. Cl.
CPC .............. G06F 21/32 (2013.01); G06V 20/70 (2022.01)

(58) Field of Classification Search
CPC ................................ G06F 21/32; G06V 20/70
See application file for complete search history.

(56) References Cited

U.S. PATENT DOCUMENTS

| | | | |
|---|---|---|---|
| 11,688,198 B1* | 6/2023 | Ranjan | G06F 18/213 |
| | | | 382/115 |
| 11,860,985 B2* | 1/2024 | Deutschmann | G06F 21/62 |
| 2021/0326422 A1* | 10/2021 | Sly | G06V 40/70 |
| 2022/0277070 A1* | 9/2022 | Robert Jose | H04L 63/0861 |
| 2024/0370690 A1* | 11/2024 | Manjunath | G06N 3/08 |

\* cited by examiner

Primary Examiner — Mohamed A. Wasel
(74) Attorney, Agent, or Firm — Lindauer Law, PLLC

(57) ABSTRACT

A biometric identification system acquires an image of at least a portion of a user that is processed by an embedding model. Additional training of the embedding model is performed using selected training data. In one implementation, the selected training data is determined based on similarity to embedding data acquired during operation. For example, a query image is processed to determine query embedding data. If the query embedding is deemed to be a close match to embedding data of a previously enrolled user, additional synthetic training data that is also similar to the query embedding data is selected for use in subsequent training. In another implementation, enrolled user data may be analyzed to find close matches to synthetic training data, from which selected training data is determined. Use of the additional synthetic training data facilitates the subsequent training in distinguishing between similar instances of embedding data.

20 Claims, 7 Drawing Sheets

SYSTEM TO DETERMINE BIOMETRIC IDENTIFICATION TRAINING DATA

BACKGROUND

Biometric input data may be used to recognize and assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
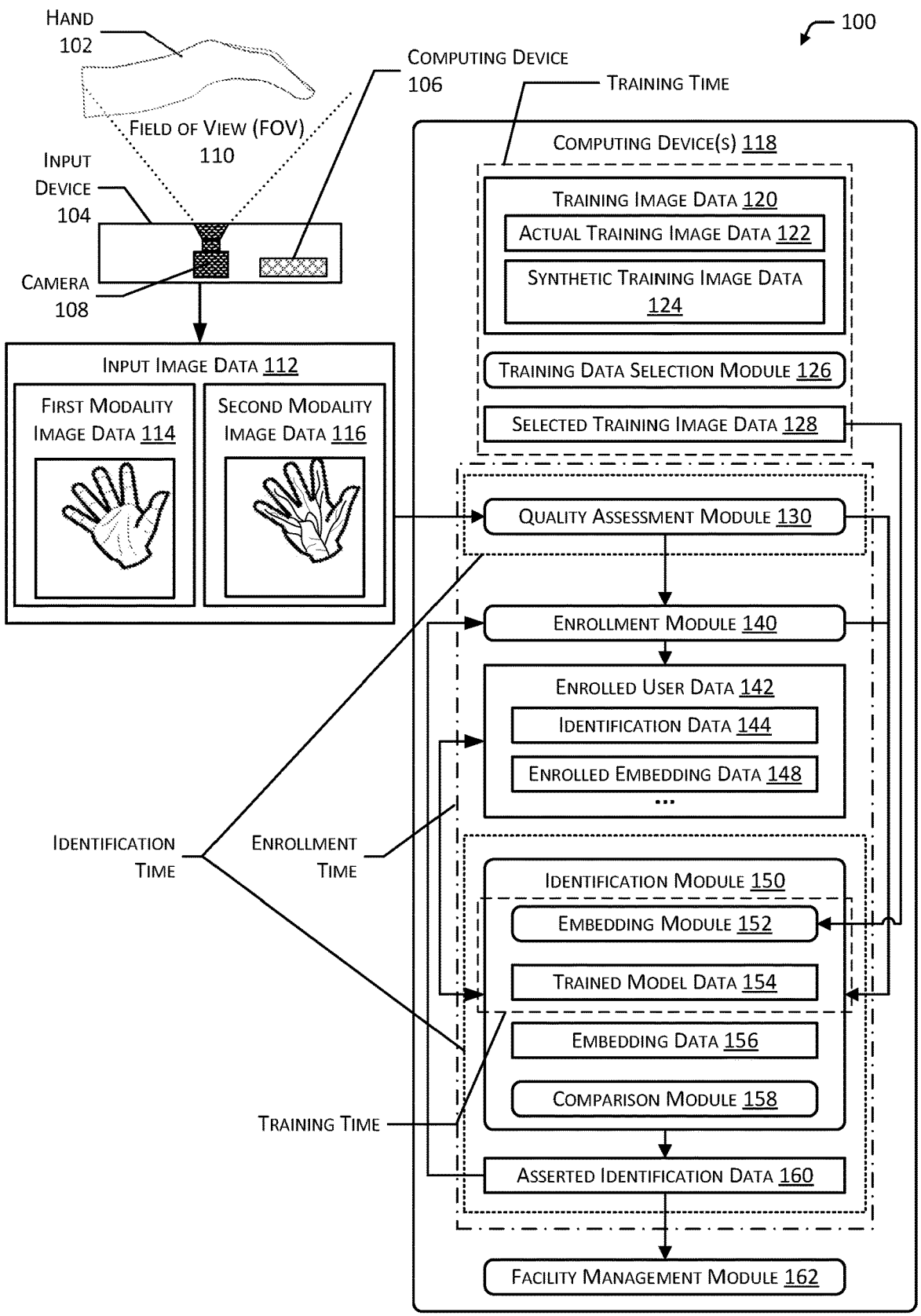
FIG. 1 illustrates a biometric identification system that determines biometric training data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Biometric input data, such as used for biometric identification, may be acquired using one or more modalities. For example, a first modality may comprise images of surface skin of a user's palm while a second modality may comprise images of subcutaneous features such as veins of the user's palm.

An embedding model comprising a machine learning network may be trained to process biometric input data and generate embedding data that comprises a vector value representative of the features depicted in that biometric input data. The desired result of the training process is to provide embedding data that is consistent for a particular identity and distinguishable from other identities. For example, an enrolled user should be recognized and their identity properly asserted, while an unenrolled user is not.

Training data used to train the embedding model may comprise actual biometric input data and synthetic biometric input data. The actual biometric input data may be acquired from individuals who have consented to such collection and use. The synthetic biometric input data is machine generated, such as provided by a generative adversarial network (GAN).

The creation and use of training data is costly. For example, actual biometric input data is expensive to obtain, requiring samples of biometric input data from individuals who choose to participate. In another example, generation of synthetic biometric input data requires expenditure of computational resources to create. Synthetic biometric input data may be based on or associated with synthetic identities that are not representative of actual individuals.

The embedding model may continue to be trained to further improve operation. However, subsequent training of the embedding model also utilizes computational resources and time, adding cost. It is advantageous for such training, either initial or subsequent, to utilize training data that facilitates the embedding model learning to distinguish between identities.

Described in this disclosure are techniques and systems to determine biometric identification training data that may be used to train an embedding model to determine embedding data suitable for asserting identification.

In one implementation the biometric identification training data is a subset of available training data. For example, synthetic biometric input data may be selected from previously generated synthetic training data and added to selected training data. In some situations, the synthetic biometric input data may be used as a proxy for unenrolled users. For example, an unenrolled user attempts to use the system. Resulting query biometric input data is processed to determine query embedding data. The query embedding data is deemed to not match, such as being too far in an embedding space from enrolled embedding data associated with a previously enrolled user. However, the query embedding data in this example is deemed to be a "near miss" due to being within a threshold distance of the enrolled embedding data. The synthetic embedding data closest to the query embedding data is determined, and the associated synthetic input data associated with that synthetic embedding data is added to the selected training data for subsequent training. Meanwhile, data associated with the unenrolled user is deleted. This allows the system to be trained to further distinguish individuals, while eliminating retention of information about unenrolled users.

In another implementation, enrolled embedding data associated with existing enrolled users may be assessed. Training data may be selected that comprises the synthetic input data associated with synthetic embedding data that is close in the embedding space to the enrolled embedding data.

In some implementations, synthetic biometric identification training data may be generated as needed to provide suitable training data. For example, if no synthetic biometric input data is available within a threshold distance in the embedding space, synthetic biometric input data may be generated.

By using the techniques described in this disclosure, training of an embedding model used by a biometric identification system is substantially improved. The determination of selected training data allows for more targeted training that in turn reduces the use of computational resources and time associated with training. As a result, training may be performed more frequently, improving overall accuracy of the system during operation.

Illustrative System

FIG. 1 illustrates a biometric identification system 100 that determines and uses biometric training data, according to some implementations. The system 100 is described as being used with respect to determining an identity of a user based on biometric input. However, the system and techniques described herein may be used in other situations.

A hand 102 of a user is depicted positioned above an input device 104. The input device 104 may include a computing device 106 and a camera 108. The camera 108 has a field of view (FOV) 110. During operation of the input device 104, the camera 108 acquires images of an object in the FOV 110, such as the hand 102, and provides input image data 112. The input device 104 may include other components which are not shown. For example, the input device 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the input device 104.

In one implementation, the input device 104 is configured to acquire images of the hand 102 that are illuminated using infrared light that has two or more particular polarizations, with different illumination patterns, and so forth. For example, during operation the user may present their hand 102 with the palm or volar region of the hand toward the input device 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the input device 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In some implementations, the input image data 112 may comprise a single image or other modality that includes information obtained from a plurality of modalities. For example, a single input image may have a first channel that represents features associated with a first modality, a second channel that represents features associated with a second modality, and so forth.

In the implementation depicted here, the input device 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the input device 104 may include a structure such as a guide or scan plate to constrain at least some movement of the hand 102. For example, the scan plate may comprise a flat pane of glass which the hand 102 may rest upon, and the camera 108 may then acquire an image.

A computing device 118 is shown. One or more computing device(s) 118 may store the following data, execute one or more of the following modules, and so forth.

Training image data 120 may comprise input image data 112. For example, the training image data 120 may comprise first modality image data 114 and second modality image data 116. The input image data 112 in the training image data 120 may be associated with label data.

The training image data 120 may comprise one or more of actual training image data 122 or synthetic training image data 124. The actual training image data 122 may comprise input image data 112 acquired by the input device 104. The actual training image data 122 may comprise actual input image data 112 that has been acquired from individuals who have opted in to provide training data. In one implementation, the actual training image data 122 may exclude individuals who have enrolled to use of the system for identification. In another implementation, some enrolled users may opt in to explicitly permit input image data 112 obtained during enrollment to be stored as actual training image data 122 for later training.

The synthetic training image data 124 may comprise input image data 112 that has been synthesized. For example, the synthetic training image data 124 may be generated by a generative adversarial network (GAN).

A training data selection module 126 may determine selected training image data 128 that may be used to train an embedding model, such as implemented by an embedding module 152 described below. The selected training image data 128 may comprise a subset of the training image data 120. Operation of the training data selection module 126 is discussed in more detail with regard to FIGS. 3-6.

A quality assessment module 130 determines if the input image data 112 or a portion thereof is deemed to be suitable for further processing. The quality assessment module 130 may determine one or more quality metrics associated with the input image data 112. If the quality metric is greater than a threshold value, the input image data 112 may be deemed suitable for further processing.

The quality assessment module 130 may assess one or more characteristics such as image blurriness or focus, image contrast, image exposure, presence of obscurants, presence of friction ridge minutiae, persistent super points (PSP), apparent illumination of the hand 102, apparent pose of the hand 102, and so forth. In one implementation the quality assessment module 130 may determine numeric values for each characteristic, and an overall quality metric may be calculated for input image data 112 as a sum of these individual numeric values. For example, the quality may be determined based on a count of minutiae and count of PSPs. In some implementations a density of minutiae, density of PSPs, or other metrics may be used.

In another implementation, the quality assessment module 130 may assess image data associated with each modality to determine if the image data for each modality exhibits a quality metric greater than a threshold value. For example, the quality assessment module 130 may determine that input image data 112 is suitable for further processing if each of the modality image data in that input image data 112 have a respective quality metric greater than a threshold value.

Use of the quality assessment module 130 to assess the input image data 112 may improve overall performance of the system 100. For example, the quality assessment module 130 may determine that first input image data 112 consisting of an out of focus, poorly lit image of a partially closed hand 102 has a quality metric that is less than the threshold value, and subsequently discard the first input image data 112. Continuing the example, in comparison second input image data 112 consisting of an in-focus image of an evenly illuminated open palm of the hand 102 may be provided to the embedding module 152 for further processing.

In some implementations, the quality assessment module 130 or other modules may perform one or more processing or preprocessing operations may be performed on the input image data 112 or other biometric input data before processing by the embedding module 152. For example, an alignment module may align the images acquired using the different modalities, a cropping module may crop the image such that a specific portion of the hand 102 is visible, a contrast adjustment module may adjust the contrast of the image, a pose conversion module may adjust the appearance of the hand 102 such that the hand 102 appears to be in a canonical pose, and so forth.

During "enrollment time", users are able to utilize the system 100 by performing an enrollment process. An enrollment module 140 may coordinate the enrollment process. Enrollment may associate biometric information, such as embedding data 156 with particular information such as a name, account number, and so forth.

During an enrollment process, the user opts in and presents their hand 102 to the input device 104. The input device 104 determines input image data 112. A trained embedding module 152 accepts as input the input image data 112 and provides as output embedding data 156. In one implementation, the trained embedding module 152 is executed on the computing device 106 of the input device 104. In another implementation, such as shown in FIG. 1, a computing device 118 executes the trained embedding module 152.

During the enrollment process, the embedding data 156 may be processed by an identification module 150 to determine whether the user has been previously enrolled. A successful enrollment may comprise storage of enrolled user data 142 comprising identification data 144, such as name, telephone number, account number, and so forth. In some implementations, the enrolled user data 142 may comprise one or more of embedding data 156 or data based thereon as enrolled embedding data 148. The embedding data 156 is determined by processing input image data 112 using an embedding module 152.

During "identification time" the (as yet unidentified) user presents their hand 102 at the input device 104. The resulting query input image data 112 may be processed by the trained embedding module 152 to determine embedding data 156.

During training, the embedding module 152 may utilize a loss function to assess the selected training image data 128 and associated labels and determine loss values. Based on these loss values, trained model data 154 is determined. Trained model data 154 may comprise weight values, bias values, threshold values, and so forth that are associated with particular nodes or functions within a machine learning network. The training process may be performed to determine embedding data that, within the respective embedding space, results in clustering of the same identity while providing separation between clusters of different identities, facilitating the distinction of one individual from another.

As mentioned above, in some implementations, the computing device 106 may execute the trained embedding module 152. The computing device 106 may perform other functions, such as encryption and transmission of the input image data 112 or data based thereon.

The identification module 150 executing on the computing device(s) 118 may accept as input the input image data 112 acquired by the input device 104. The input image data 112 may be processed by the embedding module 152 to determine query embedding data. The query embedding data may then be compared by a comparison module 158 to previously stored data, such as the enrolled embedding data 148 to determine asserted identification data 160. In one implementation, the asserted identification data 160 may comprise a user identifier associated with the closest, in one or more embedding space(s), to previously stored enrolled embedding data 148 relative to the query embedding data associated with the user who presented their hand 102 during identification time. The comparison module 158 may utilize other considerations, such as requiring that the query embedding data is no more than a maximum distance in the embedding space from the enrolled embedding data 148 of a particular user before determining the asserted identification data 160.

The asserted identification data 160 may then be used by subsequent systems or modules. For example, the asserted identification data 160, or information based thereon, may be provided to a facility management module 162.

While the input image data 112 and subsequent process is described with respect to using two or more modalities, in some implementations the system 100 may operate using a single modality.

The facility management module 162 may use the asserted identification data 160 to associate an identity with the user as they move about a facility. For example, the facility management module 162 may use data from cameras or other sensors in the environment to determine a location of the user. Given a known path of the user from an entrance that utilizes the input device 104, the user identity indicated in the identification data 144 may be associated with the user as they use the facility. For example, the now identified user may walk to a shelf, remove an item, and leave the facility. The facility management module 162 may determine the interaction data indicative of the removal of the item as being associated with the user identifier specified in the asserted identification data 160, and bill an account associated with the user identifier. In another implementation, the facility management module 162 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, iris recognition systems, voice recognition systems, object recognition systems, and so forth. For example, biometric input data may comprise one or more modalities such as images, fingerprint data, audio data, motion data, depth data, or other data that is representative of one or more features of the user. The image data may comprise images of a user or a portion thereof such as a hand 102, face, iris, fingertip, and so forth. The image data may be acquired using various techniques to produce modalities such as surface features, subcutaneous features, thermal features, and so forth. The fingerprint data may comprise data acquired using a fingerprint sensor, such as an imaging sensor, capacitive sensor, and so forth. The audio data may comprise audio data of the user acquired using one or more microphones. The motion data may comprise data acquired from an inertial measurement unit (IMU), such as in a wearable or portable device, that is indicative of the motion of the user. In some implementations, the motion data may comprise data extracted from other sensors such as a stereocamera, that is indicative of the motion of the user. The depth data may comprise data indicative of a distance or relative distance change between different points of the user, such as a point cloud representation. Continuing the example, the depth data may be indicative of the size and topology of at least a portion of the user.

In some implementations, the biometric input data may comprise other modalities. For example, the input device 104 may acquire biometric input data comprising audio data of the user speaking. This biometric input data may then be processed to determine embedding data 156 that is representative of the features of the audio data.

Figure 2:
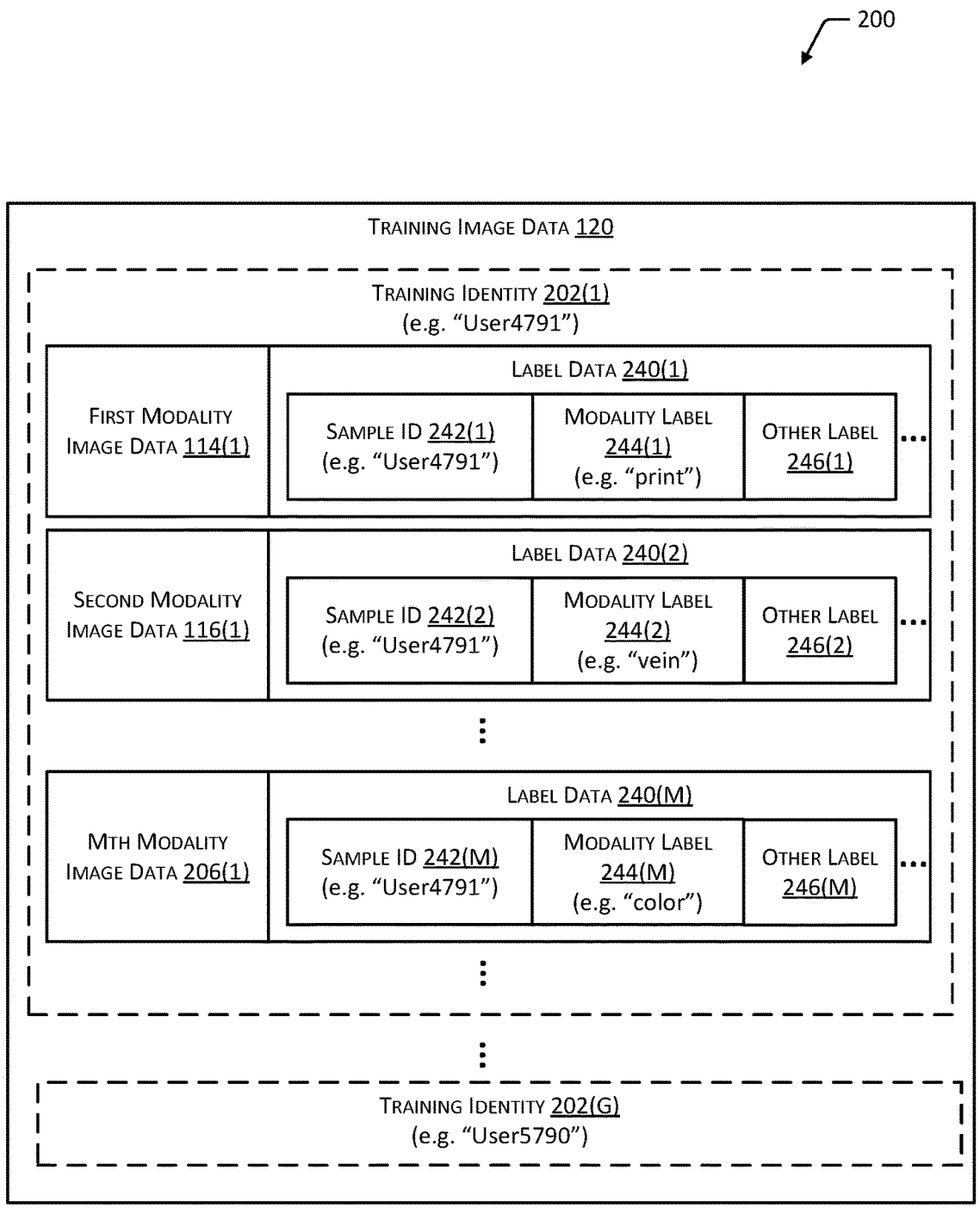
FIG. 2 illustrates training image data that is labeled for training an embedding model, according to some implementations.

FIG. 2 illustrates at 200 training image data 120 that is labeled for training a machine learning embedding network for use as the embedding module 152, according to some implementations.

The training image data 120 comprises a plurality of images that are representative of a plurality of training identities, 202(1), 202(2), . . . , 202(G). Each training identity 202 is considered to be unique with respect to the other training identities 202. Each training identity 202 may comprise a plurality of images. For example, different images may depict different poses and articulations of the same hand, actual or synthetic. A count of entries in the training image data 120 may comprise a total count of the training identities 202(G). The selected training image data 128 may comprise a subset of the training image data 120, having a total count of training identities that is less than or equal to the total count of the training identities 202(G).

The information associated with each training identity 202 may comprise actual training image data 122 acquired from users who have opted in to provide information for training, synthetic training image data 124 that has been generated, or a combination thereof. In one implementation, the training image data 120 may exclude images associated with individuals who have enrolled to use the system for identification. For example, enrolled users having identification data 144 may be excluded from inclusion in the training image data 120. In another implementation, some enrolled users may opt in to explicitly permit input image data 112 obtained during enrollment to be stored as training image data 120.

The synthetic training image data 124 may comprise synthetic data that is consistent with expected input image data 112. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 202(1)-202(G) includes modality image data and associated label data 240. The label data 240 may comprise information such as a sample identifier (ID) 242, modality label 244, and so forth. The sample ID 242 indicates a particular training identity. The sample ID 242 may be used to distinguish one training identity 202 from another. In implementations where actual input data is used as part of the training image data 120, the sample ID 242 may be assigned independently of the actual identification data 144 associated with that user. For example, the sample ID 242 may have a value of "User4791" and not the actual identity of "Bob Patel". The modality label 244 indicates whether the associated image data is representative of a first modality, second modality, and so forth.

In this illustration, each training identity 202(1)-202(G) includes first modality image data 114(1) and associated sample ID 242(1) and modality label 244(1), and second modality image data 116(1) and associated sample ID 242(2) and modality label 244(2). As used in this disclosure with respect to reference numbers, a letter within parenthesis may represent a nonzero positive integer value. For example, the training image data 120 may comprise a nonzero positive integer number of instances of training identities 202, such as having training identity 202(14) or training identity 202(348098541).

In implementations where additional modalities are used, the training image data 120 for a training identity 202 may also include Mth modality image data 206(1) and associated sample ID 242(M) and modality label 244(M).

As mentioned above, the biometric input data may comprise information acquired using a variety of modalities. For example, these modalities may include one or more of images, fingerprint data, audio data, motion data, depth data, or other data that is representative of one or more features of the user.

Figure 3:
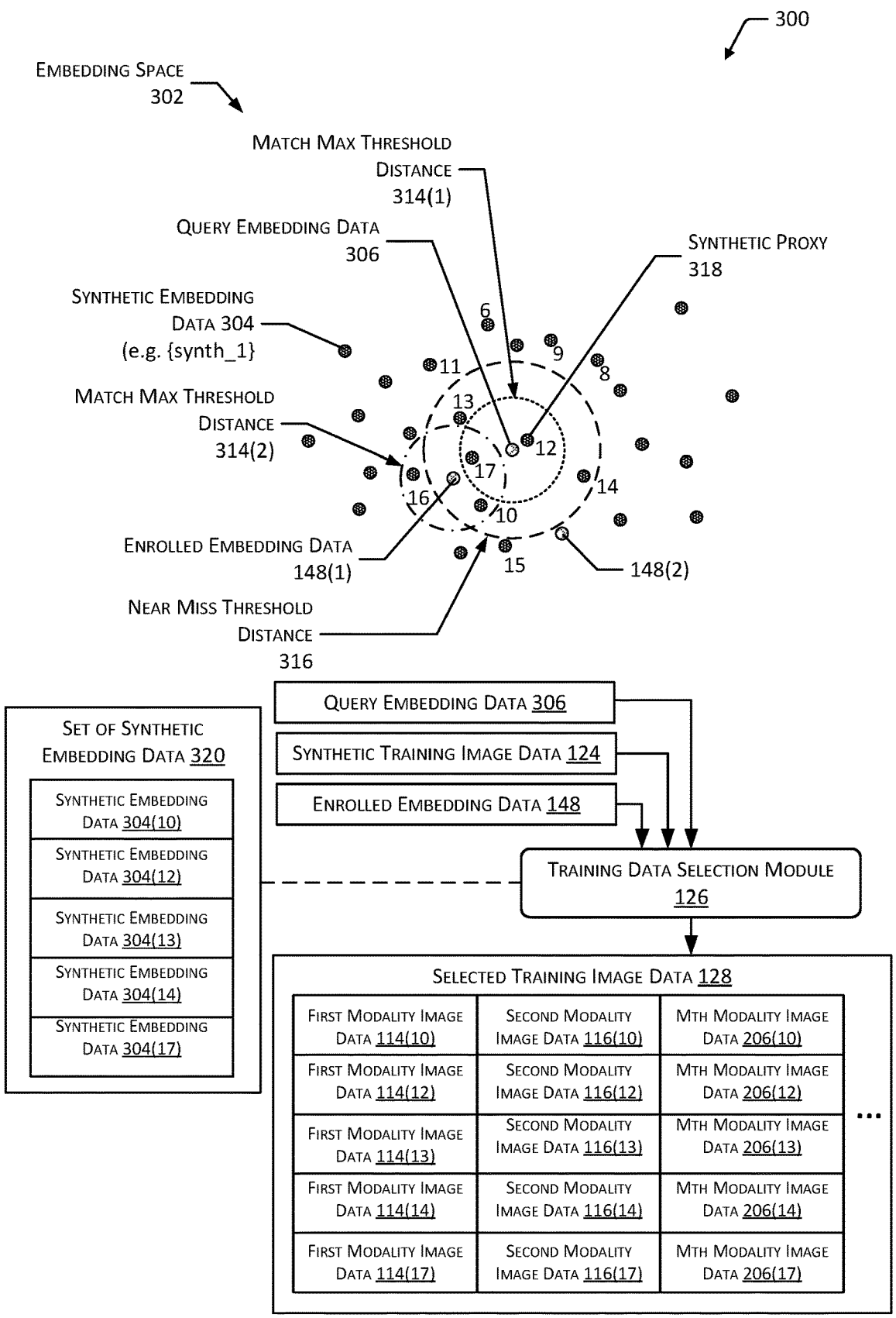
FIG. 3 illustrates a set of selected training image data, according to some implementations.

FIG. 3 illustrates at 300 a first implementation of a set of selected training image data 128, according to some implementations. This implementation may be used to acquire input image data 112 associated with a person using the system who has not been previously enrolled.

For ease of illustration and not as a limitation, an embedding space 302 is depicted as having two dimensions. During actual operation, the embedding data 156 may comprise vectors within an n-dimensional space. For example, the embedding space 302 may exceed 500 dimensions.

Depicted are discrete instances of synthetic embedding data 304 in the embedding space 302. The synthetic embedding data 304 is obtained by processing synthetic training image data 124 using the embedding module 152. The distribution, relative position, and so forth, in the embedding space 302 may be constrained or unconstrained. For example, the synthetic embedding data 304 may be specified such that a minimum distance between adjacent embeddings of synthetic embedding data 304, maximum distance, and so forth is provided. In other implementations, the synthetic embedding data 304 may be retained that corresponds to regular, periodic, or otherwise deterministic intervals within the embedding space 302.

During operation of the system 100, a hand 102 may be presented to the input device 104, resulting in input image data 112. The input image data 112 may be processed by the quality assessment module 130, and if the quality of the input image data 112 is greater than the threshold value, the input image data 112 is processed by the embedding module 152 to determine query embedding data 306.

The query embedding data 306 is representative of the features present in the input image data 112, as expressed within the embedding space 302.

Also depicted are the positions in the embedding space 302 of two instances of previously enrolled embedding data 148(1) and 148(2).

A match maximum threshold distance 314 is depicted. The match maximum threshold distance 314 may specify a maximum distance between instances of embedding data that are deemed to be representative of the same identity. For example, embedding data may be deemed to be associated with the same identity if within the match max threshold distance 314. Continuing the example, embedding data that is outside the match max threshold distance 314 would be deemed to be a different identity.

In this illustration a first match max threshold distance 314(1) is depicted with respect to the query embedding data 306. In this illustration, no enrolled embedding data 148 is present within the match max threshold distance 314(1). Synthetic embedding data 304(12) and 304(17) are within the first match max threshold distance 314(1).

In this illustration a second match max threshold distance 314(2) is depicted with respect to the enrolled embedding data 148(1) that is closest to the query embedding data 306 in the embedding space 302. Synthetic embedding data 304(10), 304(16), and 304(17) are within the second match max threshold distance 314(2).

A near miss threshold distance 316 is depicted with respect to the query embedding data 306. The near miss threshold distance 316 may specify a distance between instances of embedding data that are deemed to be a "near miss" or a close match. In this illustration, the first enrolled embedding data 148(1) and the synthetic embedding data 304(10), 304(12), 304(13), 304(14), and 304(17) are within the near miss threshold distance 316. In comparison, the second enrolled embedding data 148(2) and other synthetic embedding data 306 is outside the near miss threshold distance 316.

The training data selection module 126 may be operated in several modes.

In one mode, the training data selection module 126 may determine a synthetic proxy 318. The synthetic proxy 318 may comprise the synthetic embedding data 304 that is closest in the embedding space 302 to the query embedding data 306. In some implementations, the synthetic proxy 318 may be used for subsequent operations. For example, if the query embedding data 306 is not associated with an enrolled user, the query embedding data 306 and associated input image data 112 may be discarded and the synthetic proxy 318 may be used instead. The synthetic proxy 318 is associated with synthetic training image data 124 that may be subsequently used. For example, the synthetic proxy 318 may be included in a set of synthetic embedding data 320 and the associated synthetic training image data 124 in the corresponding selected training image data 128.

In another mode shown here, the training data selection module 126 may determine a set of synthetic embedding data 320 comprising the synthetic embedding data 304 that is within the near miss threshold distance 316. For example, as shown here the set of synthetic embedding data 320 may comprise the synthetic embedding data 304(10), 304(12), 304(13), 304(14), and 304(17) that are within the near miss threshold distance 316 that is associated with the query embedding data 306. Based on the set of synthetic embedding data 320, the training data selection module 126 determines the associated synthetic training image data 124 for inclusion in the selected training image data 128. For example, the synthetic training image data 124 included in the selected training image data 128 comprises the associated synthetic images in the first and second modality that correspond to the synthetic embedding data 304.

In another mode, the set of synthetic embedding data 320 may comprise the synthetic embedding data 304 that is at the intersection of the match max threshold distance 314(1) associated with the query embedding data 306 and the match max threshold distance 314(2) of enrolled embedding data 148, such as enrolled embedding data 148(1) in this illustration. In this mode, the set of synthetic embedding data 320 comprises the synthetic embedding data 304(17), and the selected training image data 128 would comprise the synthetic training image data 124 associated with the synthetic embedding data 304(17).

In yet another mode, the set of synthetic embedding data 320 may comprise the synthetic embedding data 304 that is located between the match max threshold distance 314(1) associated with the query embedding data 306 and within the near miss threshold distance 316. In this mode, the set of synthetic embedding data 320 comprises the synthetic embedding data 304(10), 304(13), and 304(14), and the selected training image data 128 would comprise the synthetic training image data 124 associated with these instances of synthetic embedding data 304.

In one or more of these modes, a top k selection may be used, where k is a positive integer value. For example, the top five closest synthetic embedding data 304 may be selected for inclusion in the selected set of synthetic embedding data 320.

In other implementations, other modes may be used.

Figure 4:
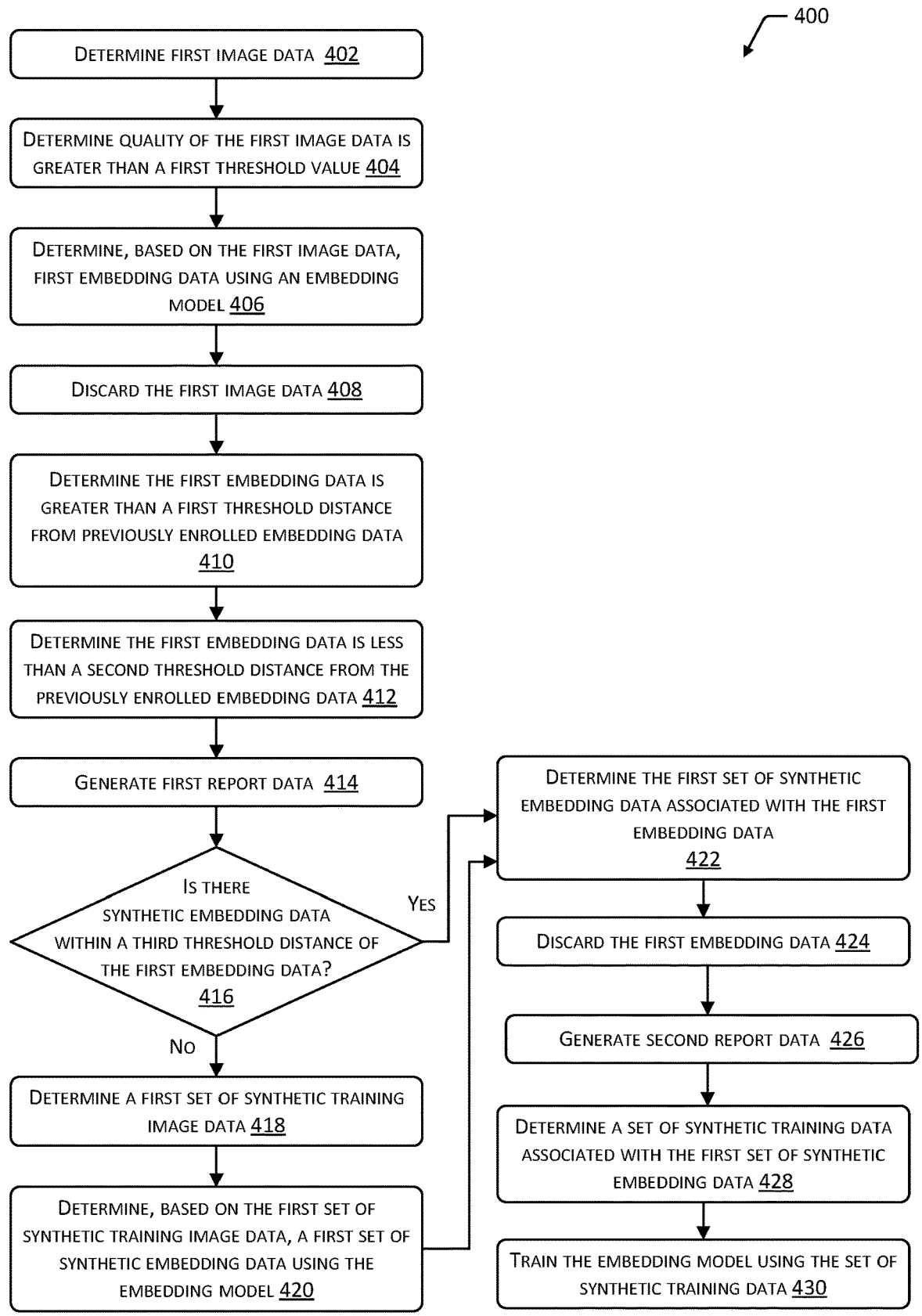
FIG. 4 illustrates a block diagram of a process to determine a set of synthetic training data, according to some implementations.

FIG. 4 illustrates a block diagram 400 of a process to determine a set of synthetic training data, according to some implementations. This process may implement the selections described above with regard to FIG. 3. The process may be implemented by instructions executing on one or more of the computing device 106 or computing device(s) 118.

At 402 first image data is determined. For example, input image data 112 may be acquired by an input device 104.

At 404 quality of the first image data is determined to be greater than a first threshold value. For example, one or more of a count of minutiae or a count of persistent super-points (PSPs) may be calculated for the first image data. If one of the counts exceeds the first threshold value, the first image data may be deemed to be of sufficient quality for the process to proceed. In other implementations, other techniques may be used to determine a value indicative of quality.

At 406, based on the first image data, first embedding data is determined using an embedding model. For example, the input image data 112 may be processed by the embedding module 152 to determine query embedding data 306.

At 408 the first image data may be discarded. For example, the first image data may be deleted from temporary storage.

At 410 the first embedding data is determined to be greater than a first threshold distance from previously enrolled embedding data 148. For example, as discussed with regard to FIG. 3, the nearest previously enrolled embedding data 148(1) is outside of the distance specified by the match max threshold distance 314(1) that is associated with the query embedding data 306. As a result, the query embedding data 306 is deemed to not be associated with the identity associated with the previously enrolled embedding data 148(1). In this example, the query embedding data 306 is thus not the same person as that associated with the first enrolled embedding data 148(1).

At 412 the first embedding data is determined to be less than a second threshold distance from the previously enrolled embedding data. For example, as discussed with regard to FIG. 3, the first enrolled embedding data 148(1) is within the near miss threshold distance 316 that is associated with the query embedding data 306. As result, while the query embedding data 306 is deemed to be a "near miss" that did not result in a misidentification, but is relatively close in the embedding space 302.

At 414 first report data may be generated. For example, the first report data may be indicative of the "near miss", that is occurrence of a query embedding data 306 that is greater than the match max threshold distance 314 but is less than the near miss threshold distance 316. In some implementations, the first report data may be further processed to facilitate operation of the training data selection module 126 and subsequent training. For example, if the number of "near misses" exceeds a threshold value, additional training may be subsequently performed using the selected training image data 128 based on those "near misses".

At 416 a determination is made as to whether there is synthetic embedding data 304 that is within a third threshold distance of the first embedding data. In some implementations, the match max threshold distance 314, the near miss threshold distance 316, or other distance may be used.

If at 416 there is no synthetic embedding data 304 within the third threshold distance, the system may proceed to 418 and generate synthetic training image data 124 that is. At 418 a first set of synthetic training image data 124 is determined. For example, a GAN or other system may be provided with seed values, starting conditions, the query embedding data 306, or information based on the query embedding data 306 and proceed to generate the first set of synthetic training image data 124.

At 420, based on the first set of synthetic training image data 124, a first set of synthetic embedding data 320 is determined using the embedding module 152. The process may then proceed to 422.

Returning to 416, if there is synthetic embedding data 304 within the third threshold distance, the process may proceed to 422. At 422 the first set of synthetic embedding data 320 is determined that is associated with the first embedding data. For example, the first set of synthetic embedding data 320 may be determined as described above with regard to FIG. 3.

At 424 the first embedding data is discarded. For example, the query embedding data 306 may be deleted from temporary storage.

At 426 second report data may be generated. For example, the second report data may be indicative of similarities or commonalities present in or otherwise associated with the first set of synthetic embedding data 320. For example, the second report data may indicate that the synthesized demographics associated with instances of the synthetic embedding data 304 in the first set of synthetic embedding data 320 are within a first range of ages, are associated with particular label values such as "occluded by sleeve", "ring on finger", "tattoo present", and so forth. In some implementations, the second report data may be further processed to facilitate operation of the training data selection module 126 and subsequent training. For example, if the synthetic identities are all associated with the label "ring on finger", additional training involving images of "ring on finger" may be advantageous.

At 428 a first set of synthetic training data associated with the first set of synthetic embedding data 320 is determined. For example, the synthetic training image data 124 associates particular instances of synthetic embedding data 304 with particular instances of synthetic training identities 202. Given the synthetic embedding data 304 or value, such as an index or identifier number associated therewith, the corresponding image data may be retrieved and designated as the selected training image data 128.

In some implementations, the training data selection module 126 may use a similar technique to select actual training image data 122 for use. As a result, the selected training image data 128 may comprise actual training image data 122.

At 430 the embedding model is trained using the set of synthetic training data. For example, the embedding module 152 may be trained using the selected training image data 128. By training with the selected training image data 128, the performance of the system may be enhanced. For example, providing the set of synthetic training image data 124 that correspond to "near miss" identities, allows the embedding model additional opportunities to learn to determine embedding data that distinguishes those near misses, such as by increasing their relative distance in the embedding space 302.

Figure 5:
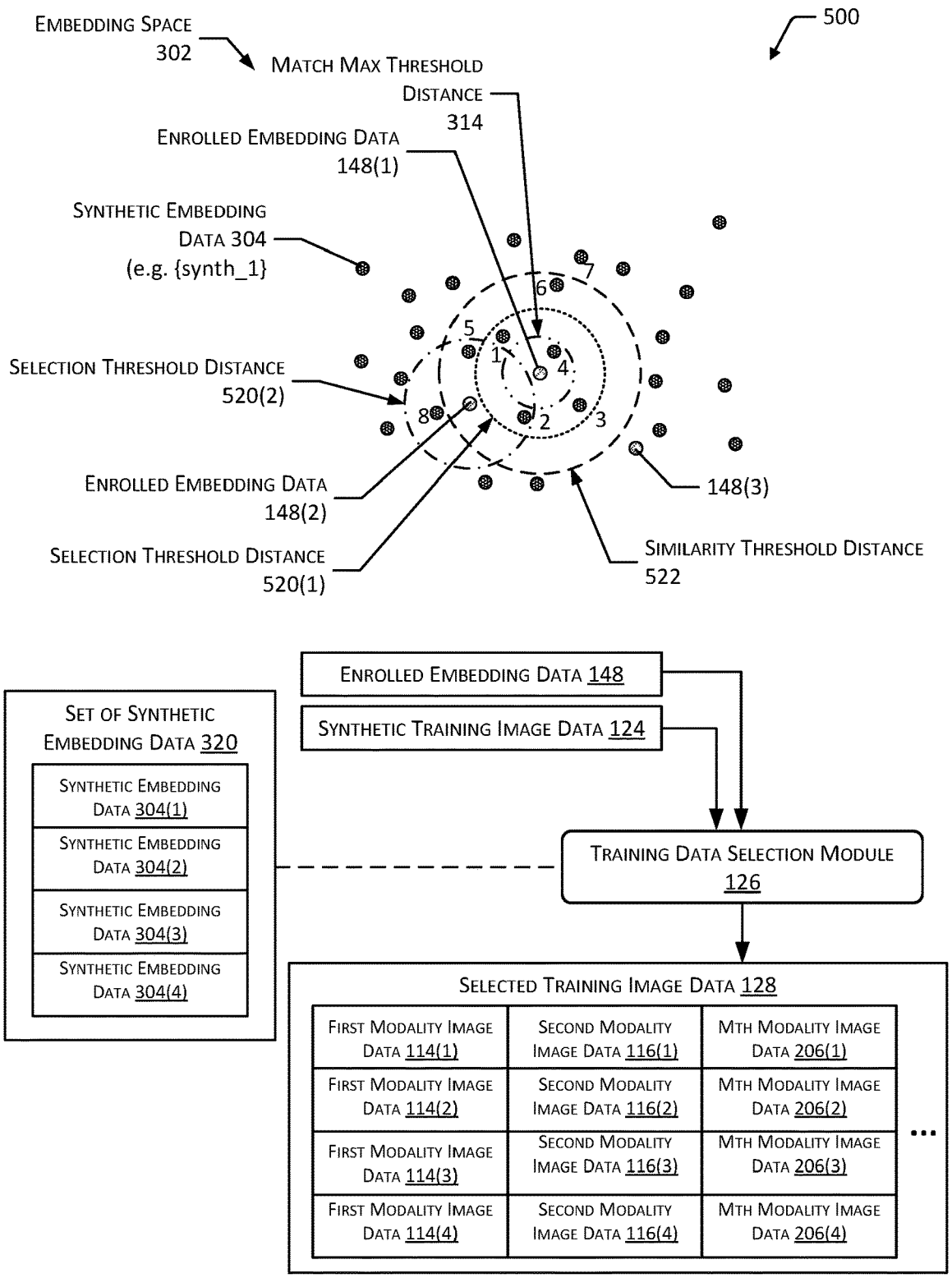
FIG. 5 illustrates a set of selected training image data, according to some implementations.

FIG. 5 illustrates at 500 a second implementation of a set of selected training image data 128, according to some implementations. This implementation may be used to process existing enrolled embedding data 148 and determine selected training image data 128. For example, this implementation may be used to further train the embedding module 152 to distinguish between identities that are relatively close in the embedding space 302.

For ease of illustration and not as a limitation, the embedding space 302 is depicted as having two dimensions. During actual operation, the embedding data 156 may comprise vectors within an n-dimensional space. For example, the embedding space 302 may exceed 500 dimensions.

Depicted are discrete instances of synthetic embedding data 304 in the embedding space 302. The synthetic embedding data 304 is obtained by processing synthetic training image data 124 using the embedding module 152. The distribution, relative position, and so forth, in the embedding space 302 may be constrained or unconstrained. For example, the synthetic embedding data 304 may be specified such that a minimum distance between adjacent embeddings of synthetic embedding data 304, maximum distance, and so forth is provided. In other implementations, the synthetic embedding data 304 may be retained that corresponds to regular, periodic, or otherwise deterministic intervals within the embedding space 302.

During the enrollment process, enrolled user data 142 is determined that includes enrolled embedding data 148. The enrolled embedding data 148 is representative of the features present in the input image data 112 provided during enrollment, as expressed within the embedding space 302. Depicted is enrolled embedding data 148(1).

Also depicted are the positions in the embedding space 302 of enrolled embedding data 148(2) and 148(3).

As described above, a match maximum threshold distance 314 is depicted. The match maximum threshold distance 314 may specify a maximum distance between instances of embedding data that are deemed to be representative of the same identity. For example, embedding data may be deemed to be associated with the same identity if within the match max threshold distance 314. Continuing the example, embedding data that is outside the match max threshold distance 314 would be deemed to be a different identity.

In this illustration a match max threshold distance 314 is depicted with respect to the enrolled embedding data 148(1). In this illustration, no other enrolled embedding data 148 is present within the match max threshold distance 314. Synthetic embedding data 304(4) is within the match max threshold distance 314.

In this illustration a selection threshold distance 520 is depicted with respect to individual instances of enrolled embedding data 148. A first selection threshold distance 520(1) is associated with the first enrolled embedding data 148(1) and a second selection threshold distance 520(2) is associated with the second enrolled embedding data 148(2). In this illustration, the synthetic embedding data 304(1), 304(2), 304(3), and 304(4) are within the first selection threshold distance 520(1). Also in this illustration, the synthetic embedding data 304(2), 304(5), and 304(8) are within the second selection threshold distance 520(2).

In this illustration a similarity threshold distance 522 is depicted with respect to the enrolled embedding data 148(1). In this illustration, second enrolled embedding data 148(2) is present within the similarity threshold distance 522 as well as synthetic embedding data 304(1)-(6).

The training data selection module 126 may be operated in several modes to determine selected training image data 128.

In one mode shown, the training data selection module 126 may determine a set of synthetic embedding data 320 comprising the synthetic embedding data 304 that is within the selection threshold distance 520. For example, as shown here the set of synthetic embedding data 320 may comprise the synthetic embedding data 304(1), 304(2), 304(3), and 304(4) that are within the first selection threshold distance 520(1) that is associated with the first enrolled embedding data 148(1). Based on the set of synthetic embedding data 320, the training data selection module 126 determines the associated synthetic training image data 124 for inclusion in the selected training image data 128. For example, the synthetic training image data 124 included in the selected training image data 128 comprises the associated synthetic images in the first and second modality that correspond to the synthetic embedding data 304.

In another mode, the training data selection module 126 may determine a set of synthetic embedding data 320 comprising the synthetic embedding data 304 that is within the match max threshold distance 314. For example, the set of synthetic embedding data 320 may comprise the synthetic embedding data 304(4) that is within the match max threshold distance 314 that is associated with the first enrolled embedding data 148(1).

In another mode, the training data selection module 126 may determine a set of synthetic embedding data 320 comprising the synthetic embedding data 304 that is greater than the match max threshold distance 314 but less than the selection threshold distance 520(1). For example, the set of synthetic embedding data 320 that is associated with the first enrolled embedding data 148(1) may comprise the synthetic embedding data 304(1), 304(2), and 304(3).

In another mode, the training data selection module 126 may determine a set of synthetic embedding data 320 comprising the synthetic embedding data 304 that is within the similarity threshold distance 522. For example, the set of synthetic embedding data 320 that is associated with the first enrolled embedding data 148(1) may comprise the synthetic embedding data 304(1)-(6).

In one or more of these modes, a top k selection may be used, where k is a positive integer value. For example, the top five closest synthetic embedding data 304 to the enrolled embedding data 148(1) may be selected for inclusion in the selected set of synthetic embedding data 320.

In other implementations, other modes may be used.

Figure 6:
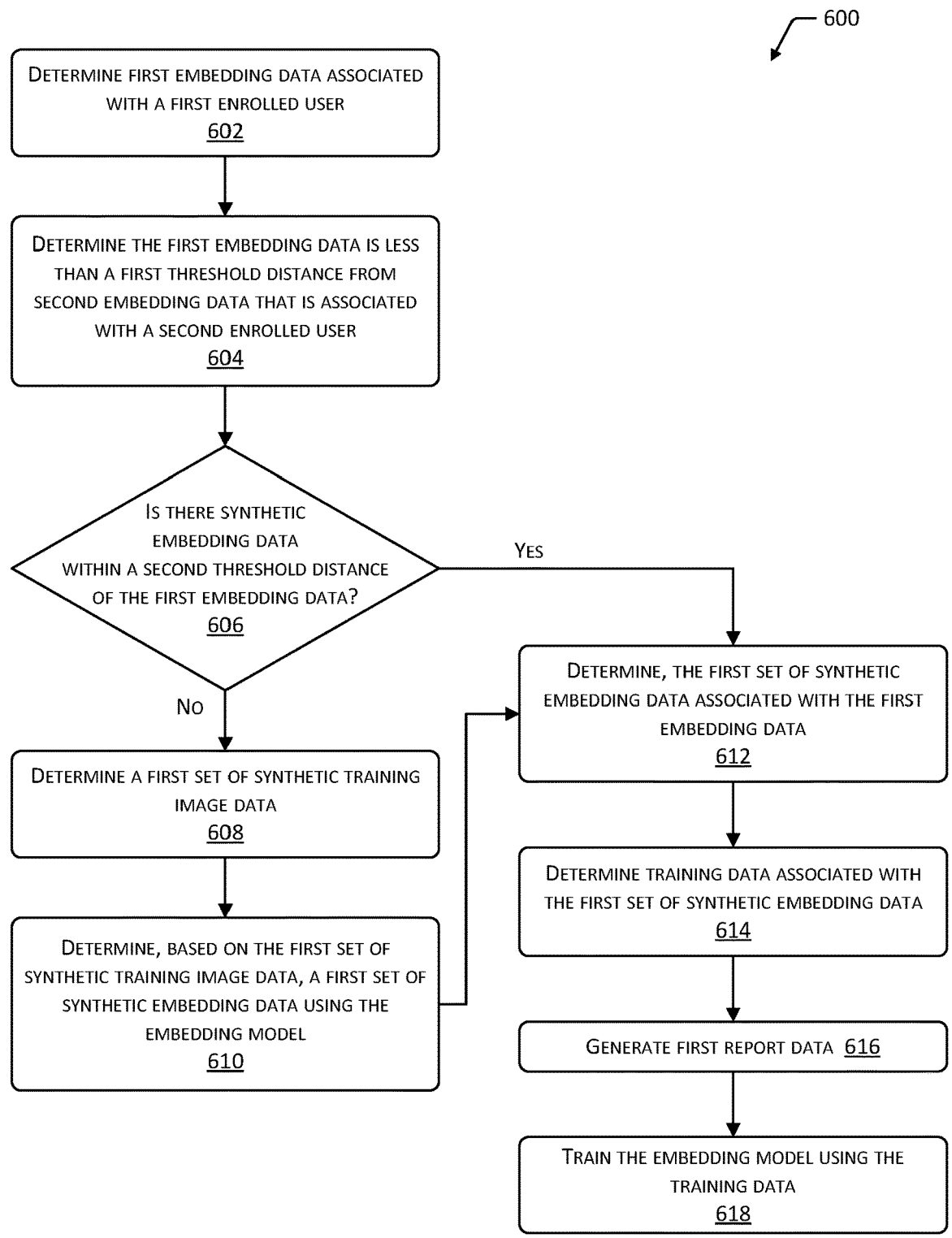
FIG. 6 illustrates a block diagram of a process to determine a set of synthetic training data, according to some implementations.

FIG. 6 illustrates a block diagram 600 of a process to determine a set of synthetic training data, according to some implementations. This process may implement the selections described above with regard to FIG. 5. The process may be implemented by instructions executing on one or more of the computing device 106 or computing device(s) 118.

At 602 first embedding data associated with a first enrolled user is determined. For example, first enrolled embedding data 148(1) may be retrieved from enrolled user data 142.

At 604 the first embedding data is determined to be less than a first threshold distance in an embedding space from second embedding data that is associated with a second enrolled user. For example, the second enrolled embedding data 148(2) is determined to be within the similarity threshold distance 522 of the first enrolled embedding data 148(1).

At 606 a determination is made as to whether there is synthetic embedding data 304 that is within a second threshold distance of the first embedding data. For example, is there synthetic embedding data 304 that is within one or more of the selection threshold distance 520(1), the similarity threshold distance 522, or another distance?

If at 606 there is no synthetic embedding data 304 within the second threshold distance, the system may proceed to 608 and generate synthetic training image data 124 that is. At 608 a first set of synthetic training image data 124 is determined. For example, a GAN or other system may be provided with seed values, starting conditions, the first enrolled user data 148(1), or information based on the first enrolled user data 148(1) and proceed to generate the first set of synthetic training image data 124.

At 610, based on the first set of synthetic training image data 124, a first set of synthetic embedding data 320 is determined using the embedding module 152. The process may then proceed to 612.

Returning to 606, if there is synthetic embedding data 304 within the second threshold distance, the process may proceed to 612.

At 612 the first set of synthetic embedding data 320 is determined that is associated with the first embedding data. For example, the first set of synthetic embedding data 320 may be determined as described above with regard to FIG. 5.

At 614 a first set of synthetic training data associated with the first set of synthetic embedding data 320 is determined.

For example, the synthetic training image data 124 associates particular instances of synthetic embedding data 304 with particular instances of synthetic training identities 202. Given the synthetic embedding data 304 or value, such as an index or identifier number associated therewith, the corresponding image data may be retrieved and designated as the selected training image data 128.

In some implementations, the training data selection module 126 may use a similar technique to select actual training image data 122 for use. As a result, the selected training image data 128 may comprise actual training image data 122.

At 616 first report data may be generated. For example, the first report data may be indicative of similarities or commonalities present in or otherwise associated with the first set of synthetic embedding data 320. For example, the first report data may indicate that the synthesized demographics associated with instances of the synthetic embedding data 304 in the first set of synthetic embedding data 320 are within a first range of ages, are associated with particular label values such as "occluded by sleeve", "ring on finger", "tattoo present", and so forth. In some implementations, the second report data may be further processed to facilitate operation of the training data selection module 126 and subsequent training. For example, if the synthetic identities are all associated with the label "occluded by sleeve", additional training involving images of "occluded by sleeve" may be advantageous.

At 618 the embedding model is trained using the set of synthetic training data. For example, the embedding module 152 may be trained using the selected training image data 128. By training with the selected training image data 128, the performance of the system may be enhanced. For example, providing the set of synthetic training image data 124 that are relatively close to enrolled identities, allows the embedding model additional opportunities to learn to determine embedding data that distinguishes those identities.

Figure 7:
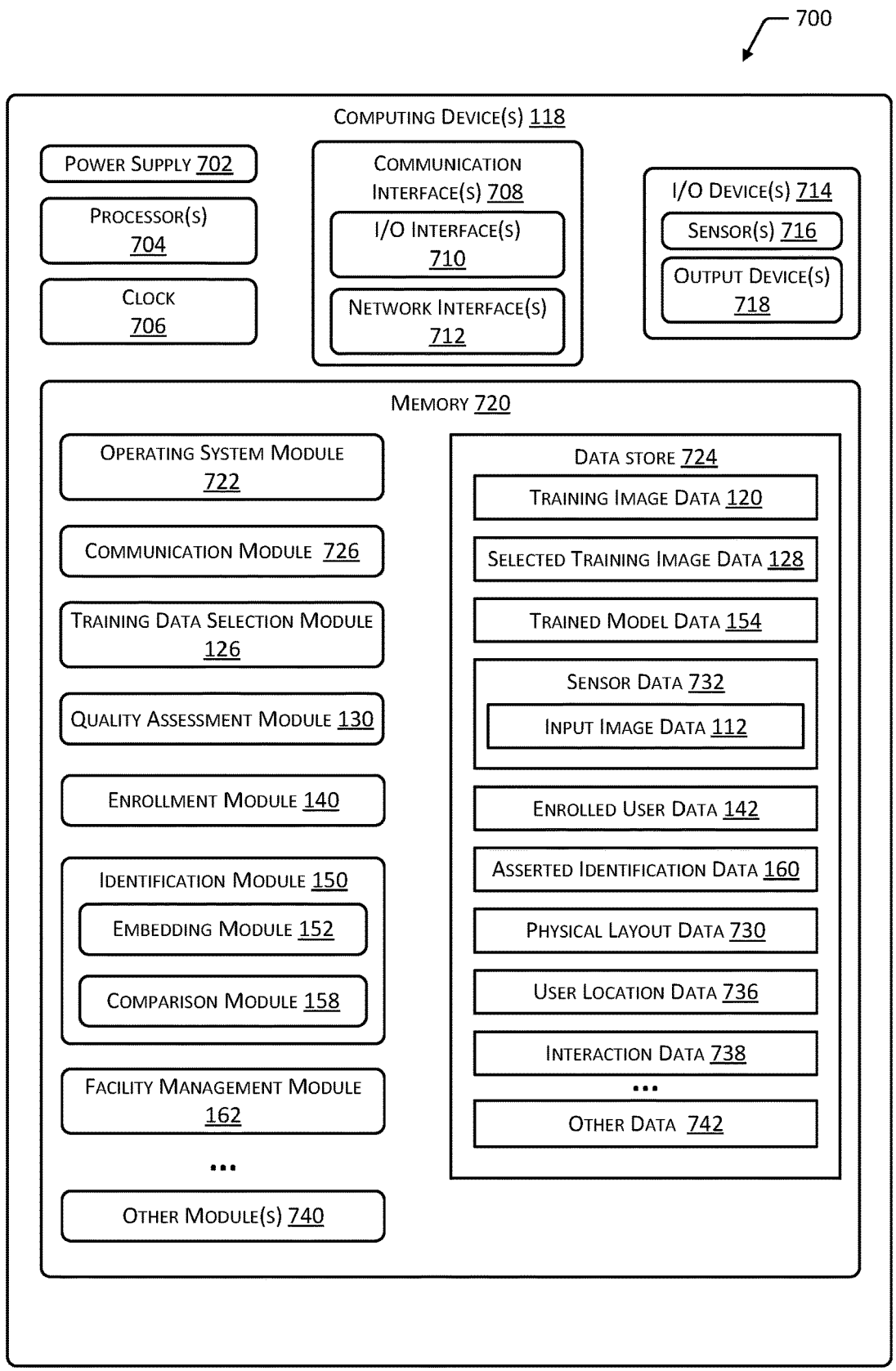
FIG. 7 is a block diagram of a computing device to implement the system, according to some implementations.

FIG. 7 is a block diagram 700 of the computing device 118 to implement the system, according to some implementations. The computing device 118 may be within the input device 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (SaaS)", "platform computing", "network-accessible platform", "cloud services", "data centers", and so forth. Services provided by the computing device 118 may be distributed across one or more physical or virtual devices.

One or more power supplies 702 may be configured to provide electrical power suitable for operating the components in the computing device 118. The one or more power supplies 702 may comprise batteries, capacitors, fuel cells, photovoltaic cells, wireless power receivers, conductive couplings suitable for attachment to a power source such as provided by an electric utility, and so forth. The computing device 118 may include one or more hardware processors 704 (processors) configured to execute one or more stored instructions. The processors 704 may comprise one or more cores. One or more clocks 706 may provide information indicative of date, time, ticks, and so forth. For example, the processor 704 may use data from the clock 706 to associate a particular interaction with a particular point in time.

The computing device 118 may include one or more communication interfaces 708 such as input/output (I/O) interfaces 710, network interfaces 712, and so forth. The communication interfaces 708 enable the computing device 118, or components thereof, to communicate with other devices or components. The communication interfaces 708 may include one or more I/O interfaces 710. The I/O interfaces 710 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include input devices such as one or more of a sensor 716, keyboard, mouse, scanner, and so forth. The I/O devices 714 may also include output devices 718 such as one or more of a display device, printer, audio speakers, and so forth. In some embodiments, the I/O devices 714 may be physically incorporated with the computing device 118 or may be externally placed. The sensors 716 may comprise the camera 108, smartcard readers, touch sensors, microphones, and so forth.

The network interfaces 712 may be configured to provide communications between the computing device 118 and other devices, such as routers, access points, and so forth. The network interfaces 712 may include devices configured to couple to personal area networks (PANs), local area networks (LANs), wireless local area networks (WLANS), wide area networks (WANs), and so forth. For example, the network interfaces 712 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 7, the computing device 118 includes one or more memories 720. The memory 720 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 720 provides storage of computer-readable instructions, data structures, program modules, and other data for the operation of the computing device 118. Several functional modules are shown stored in the memory 720, although the same functionality may alternatively be implemented in hardware, firmware, or as a system on a chip (SoC).

The memory 720 may include at least one operating system (OS) module 722. The OS module 722 is configured to manage hardware resource devices such as the I/O interfaces 710, the I/O devices 714, the communication interfaces 708, and provide various services to applications or modules executing on the processors 704. The OS module 722 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 726 may be configured to establish communications with the computing device 118, servers, other computing devices 106, or other devices. The communications may be authenticated, encrypted, and so forth.

The training data selection module 126 may be stored in the memory 720.

The quality assessment module 130 may be stored in the memory 720.

The enrollment module 140 may be stored in the memory 720.

The identification module 150 may be stored in the memory 720.

Also stored in the memory 720 may be a data store 724 and one or more of the following modules. These modules may be executed as foreground applications, background tasks, daemons, and so forth. The data store 724 may use a flat file, database, linked list, tree, executable code, script, or other data structure to store information. In some implementations, the data store 724 or a portion of the data store 724 may be distributed across one or more other devices including other computing devices 106, network attached storage devices, and so forth.

The data store 724 may store the training image data 120, selected training image data 128, and other information. The data store 724 may store trained model data 154. The data store 724 may store enrolled user data 142.

In some implementations, the input image data 112 may be temporarily stored during processing. For example, the input device 104 may acquire the input image data 112, determine embedding data 156 based on the input image data 112, and then erase the input image data 112. The resulting embedding data 156 may then be processed to perform enrollment, for comparison to assert an identity, and so forth.

The facility management module 162 may perform various functions, such as tracking items between different inventory locations, to and from carts, generating restocking orders, directing operation of robots within the facility, using the asserted identification data 160 to associate a particular user identity with a user in the facility, and so forth. During operation, the facility management module 162 may access sensor data 732 such as input image data 112, or data from other sensors 716.

Information used by the facility management module 162 may be stored in the data store 724. For example, the data store 724 may be used to store physical layout data 730, sensor data 732, asserted identification data 160, user location data 736, interaction data 738, and so forth. For example, the sensor data 732 may comprise the input image data 112 obtained from an input device 104 associated with the facility.

The physical layout data 730 may provide information indicative of where input devices 104, cameras, weight sensors, antennas for radio receivers, inventory locations, and so forth are within the facility with respect to one another. For example, the physical layout data 730 may comprise information representative of a map or floor plan of the facility with relative positions of gates with input devices 104 and inventory locations.

The facility management module 162 may generate the user location data 736 that is indicative of the location of the user within the facility. For example, the facility management module 162 may use image data obtained by the cameras to determine a location of the user. In other implementations, other techniques may be used for determining the user location data 736. For example, data from a smart floor may be used to determine the location of the user.

The identification data 144 may be associated with user location data 736. For example, the user enters the facility and has their hand 102 scanned by the input device 104, resulting in asserted identification data 160 that is associated with their time of entry and the input device 104 location. The user location data 736 indicative of a path of the user that begins at the input device 104 location at the time of entry may be associated with the user identifier in the asserted identification data 160.

Based on the user location data 736 and the interaction data 738, a particular interaction may be associated with an account of a particular user. For example, if the user location data 736 indicates that the user is present in front of inventory location 792 at time 09:02:02 and the interaction data 738 indicates a pick of a quantity of one item from an area on inventory location 792 at 09:04:13, the user may be billed for that pick.

The facility management module 162 may use the sensor data 732 to generate the interaction data 738. The interaction data 738 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 162 may generate interaction data 738 that indicates what item the user picked from a particular lane on a shelf, and then use this interaction data 738 to adjust the count of inventory stowed at that lane. The interaction data 738 may then be used to bill an account associated with the user identifier that is associated with the user who picked the item.

The facility management module 162 may process the sensor data 732 and generate output data. For example, based on the interaction data 738, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 740 may also be present in the memory 720 as well as other data 742 in the data store 724. For example, a billing module may use the interaction data 738 and the asserted identification data 160 to bill an account associated with a particular user.

The devices and techniques described in this disclosure may be used in a variety of other settings. For example, the system 100 may be used in conjunction with a point-of-sale (POS) device. The user may present their hand 102 to an input device 104 to provide an indication of intent and authorization to pay with an account associated with the asserted identification data 160. In another example, a robot may incorporate an input device 104. The robot may use the asserted identification data 160 to determine whether to deliver a parcel to the user, and based on the asserted identification data 160, which parcel to deliver.

While the input to the system 100 is discussed with respect to image data, the system may be used with other types of input. For example, the input may comprise data acquired from one or more sensors 716, data generated by another system, and so forth. For example, instead of image data produced by the camera 108, the input to the system 100 may comprise an array of data. Other modalities may also be used. For example, the first modality may be visible light, the second modality may be radar, and so forth.

While the system 100 is discussed with respect to processing biometric data, the system may be used with other types of data. For example, the input may comprise remote sensing data, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more memories, storing first computer-executable instructions; and
one or more hardware processors to execute the first computer-executable instructions to:
determine first image data acquired by an input device;
determine first embedding data using an embedding model to process the first image data;
determine the first embedding data is greater than a first threshold distance from second embedding data in a first embedding space;
based on the first embedding data being greater than the first threshold distance from the second embedding data in the first embedding space, determine a first set of synthetic embedding data that is associated with the first embedding data by one or more of:
generating the first set of synthetic embedding data within a second threshold distance of the first embedding data in the first embedding space; or
selecting the first set of synthetic embedding data based on the first set of synthetic embedding data being within the second threshold distance of the first embedding data within the first embedding space;
determine a first set of synthetic training image data that is associated with the first set of synthetic embedding data; and
train the embedding model using at least the first set of synthetic training image data.

2. The system of claim 1, wherein the first set of synthetic training image data comprises:
a first synthetic image associated with a first synthetic identity and a first modality, and
a second synthetic image associated with the first synthetic identity and a second modality; and
the one or more hardware processors to execute the first computer-executable instructions to:
determine the first set of synthetic embedding data using the embedding model to process the first set of synthetic training image data; and
the first image data comprising:
a first image associated with the first modality, and
a second image associated with the second modality.

3. The system of claim 1, wherein the first set of synthetic training image data comprises a first synthetic image associated with a first synthetic identity and a first modality; and
the one or more hardware processors to execute the first computer-executable instructions to:
determine the first set of synthetic embedding data using the embedding model to process the first set of synthetic training image data; and
the first image data comprising:
a first image associated with the first modality.

4. The system of claim 1, the instructions to determine the first set of synthetic embedding data comprising instructions to:
determine a top k instances of synthetic embedding data that are closest in the first embedding space to the first embedding data, wherein each instance is associated with a respective synthetic identity.

5. The system of claim 1, the instructions to determine the first set of synthetic embedding data comprising instructions to:
determine instances of synthetic embedding data that are within the second threshold distance of the first embedding data in the first embedding space, wherein each instance is associated with a respective synthetic identity.

6. The system of claim 1, the instructions to determine the first set of synthetic embedding data comprising instructions to:
- determine instances of synthetic embedding data that are:
  - between the second threshold distance and a third threshold distance from the first embedding data in the first embedding space; and
  - wherein each instance is associated with a respective synthetic identity.

7. The system of claim 1, the one or more hardware processors to execute the first computer-executable instructions to:
- determine the first embedding data is less than the second threshold distance from the second embedding data;
- determine one or more labels associated with individual instances of the first set of synthetic training image data; and
- determine report data based on the one or more labels.

8. The system of claim 1, the one or more hardware processors to execute the first computer-executable instructions to:
- determine, before the first image data is acquired, synthetic embedding data; and
- delete the first image data and the first embedding data.

9. A system comprising:
- one or more memories, storing first computer-executable instructions; and
- one or more hardware processors to execute the first computer-executable instructions to:
  - determine first embedding data in a first embedding space, wherein the first embedding data is associated with a first enrolled user;
  - determine second embedding data in the first embedding space, wherein the second embedding data is associated with a second enrolled user;
  - determine the first embedding data is less than a first threshold distance from the second embedding data;
  - based on the first embedding data being less than the first threshold distance from the second embedding data, determine a first set of synthetic embedding data that is associated with one or more of the first embedding data or the second embedding data, wherein the first set of synthetic embedding data is within a second threshold distance of the one or more of the first embedding data or the second embedding data;
  - determine a first set of synthetic training image data that is associated with the first set of synthetic embedding data; and
  - train an embedding model using at least the first set of synthetic training image data.

10. The system of claim 9, wherein the first set of synthetic training image data comprises:
- a first synthetic image associated with a first synthetic identity and a first modality, and
- a second synthetic image associated with the first synthetic identity and a second modality; and the one or more hardware processors to execute the first computer-executable instructions to:
- determine the first set of synthetic embedding data using the embedding model to process the first set of synthetic training image data.

11. The system of claim 9, the instructions to determine the first set of synthetic embedding data comprising instructions to:
- determine a top k instances of synthetic embedding data that are closest in the first embedding space to one or more of the first embedding data or the second embedding data, wherein each instance is associated with a respective synthetic identity.

12. The system of claim 9, the instructions to determine the first set of synthetic embedding data comprising instructions to:
- determine instances of synthetic embedding data that are within the second threshold distance of the one or more of the first embedding data or the second embedding data in the first embedding space, wherein each instance is associated with a respective synthetic identity.

13. The system of claim 9, the instructions to determine the first set of synthetic embedding data comprising instructions to:
- determine instances of synthetic embedding data that are:
  - between the second threshold distance and a third threshold distance from the first embedding data in the first embedding space; and
  - wherein each instance is associated with a respective synthetic identity.

14. The system of claim 9, the one or more hardware processors to execute the first computer-executable instructions to:
- determine the first embedding data is less than the second threshold distance from the second embedding data;
- determine one or more labels associated with individual instances of the first set of synthetic training image data; and
- determine report data based on the one or more labels.

15. A computer-implemented method comprising:
- determining first image data acquired by an input device;
- determining first embedding data using an embedding model to process the first image data;
- determining the first embedding data is greater than a first threshold distance from second embedding data in a first embedding space;
- based on the first embedding data being greater than the first threshold distance from the second embedding data in the first embedding space, determining a first set of synthetic embedding data that is associated with the first embedding data, wherein the first set of synthetic embedding data is within a second threshold distance of the first embedding data;
- determining a first set of synthetic training image data that is associated with the first set of synthetic embedding data; and
- training the embedding model using at least the first set of synthetic training image data.

16. The method of claim 15, the determining the first set of synthetic embedding data comprising:
- determining a top k instances of synthetic embedding data that are closest in the first embedding space to the first embedding data, wherein each instance is associated with a respective synthetic identity; and
- selecting the first set of synthetic embedding data from the top k instances of synthetic embedding data.

17. The method of claim 15, the determining the first set of synthetic embedding data comprising:
- determining instances of synthetic embedding data that are within the second threshold distance of the first embedding data in the first embedding space, wherein each instance is associated with a respective synthetic identity; and
- selecting the first set of synthetic embedding data from the instances of synthetic embedding data.

18. The method of claim 15, the determining the first set of synthetic training image data comprising:
- determining a first synthetic image associated with a first synthetic identity and a first modality;
- determining the first set of synthetic embedding data using the embedding model to process the first set of synthetic training image data; and
- wherein the first image data is associated with the first modality.

19. The method of claim 15, the determining the first set of synthetic embedding data comprising:
- determining the first embedding data is less than the second threshold distance from the second embedding data;
- determining one or more labels associated with individual instances of the first set of synthetic training image data; and
- determining report data based on the one or more labels.

20. The method of claim 15, further comprising:
- determining, before the first image data is acquired, synthetic embedding data; and
- deleting the first image data and the first embedding data.

\* \* \* \* \*